US010142834B2

(12) United States Patent
Narasimha et al.

(10) Patent No.: US 10,142,834 B2
(45) Date of Patent: Nov. 27, 2018

(54) METHOD AND APPARATUS FOR OPERATING A USER CLIENT WIRELESS COMMUNICATION DEVICE ON A WIRELESS WIDE AREA NETWORK

(71) Applicant: Motorola Mobility LLC, Chicago, IL (US)

(72) Inventors: Murali Narasimha, Vernon Hills, IL (US); Eric Berdinis, Chicago, IL (US); Steve S Kim, Park Ridge, IL (US); Robert T Love, Barrington, IL (US)

(73) Assignee: Motorola Mobility LLC, Chicago, IL (US)

( * ) Notice: Subject to any disclaimer, the term of this patent is extended or adjusted under 35 U.S.C. 154(b) by 367 days.

(21) Appl. No.: 14/608,282

(22) Filed: Jan. 29, 2015

(65) Prior Publication Data
US 2016/0227403 A1 Aug. 4, 2016

(51) Int. Cl.
*H04M 1/66* (2006.01)
*H04W 12/06* (2009.01)
(Continued)

(52) U.S. Cl.
CPC ........... *H04W 12/06* (2013.01); *H04L 63/068* (2013.01); *H04W 12/04* (2013.01)

(58) Field of Classification Search
CPC ..... H04W 12/12; H04W 12/06; H04W 88/02; H04W 12/08; H04W 12/02; H04L 63/08
(Continued)

(56) References Cited

U.S. PATENT DOCUMENTS 6,092,133 A 7/2000 Erola et al.
6,466,804 B1 10/2002 Pecen et al.
(Continued)

OTHER PUBLICATIONS

Gmate, "Turns you Android or iOS Device Into a Dual-Sim Phone!" YouTube, https://www.youtube.com/watch?v=fl1G3Ev6V9A, Jan. 8, 2015, 2 pages.
(Continued)

*Primary Examiner* — Dai A Phuong
(74) *Attorney, Agent, or Firm* — Matthew C. Loppnow; The Watson I.P. Group, PLC

(57) ABSTRACT

A method and apparatus operate a user client wireless communication device on a wireless wide area network. A communication link can be established at the user client wireless communication device with a user wireless wide area network communication device. A random challenge and an authentication token can be received from a wireless wide area network. The random challenge and the authentication token can be sent to the user wireless wide area network communication device. The at least one temporary wireless wide area network communication security key can be received from the user wireless wide area network communication device, where the at least one temporary wireless wide area network communication security key is for the wireless wide area network. The user client wireless communication device can operate on the wireless wide area network using the at least one temporary wireless wide area network communication security key from the user wireless wide area network communication device independent from the user wireless wide area network communication device.

24 Claims, 11 Drawing Sheets

(51) Int. Cl.
*H04W 12/04* (2009.01)
*H04L 29/06* (2006.01)

(58) Field of Classification Search
USPC .............. 455/410–411 B, 433–435.1, 458, 455/515–519, 550.1–551
See application file for complete search history.

(56) References Cited

U.S. PATENT DOCUMENTS

| | | | |
|---|---|---|---|
| 6,868,282 | B2 | 3/2005 | Carlsson |
| 8,195,233 | B2 * | 6/2012 | Morikuni .............. H04W 12/08 380/247 |
| 2011/0296494 | A1 * | 12/2011 | Muller ................ H04L 63/0853 726/3 |
| 2012/0036360 | A1 * | 2/2012 | Bassu .................. H04L 9/3228 713/168 |
| 2012/0129500 | A1 * | 5/2012 | Rajadurai ........... H04L 63/0815 455/411 |
| 2013/0155948 | A1 * | 6/2013 | Pinheiro .............. H04W 76/10 370/328 |
| 2014/0010180 | A1 * | 1/2014 | Lee ...................... H04W 48/02 370/329 |
| 2015/0026787 | A1 * | 1/2015 | Zhang .................. H04W 12/06 726/7 |
| 2015/0105068 | A1 * | 4/2015 | Khalil .................. H04W 24/04 455/424 |
| 2015/0189507 | A1 * | 7/2015 | Bournelle ............ H04W 12/06 726/5 |
| 2015/0296379 | A1 * | 10/2015 | Nix ....................... H04L 9/0869 713/171 |

OTHER PUBLICATIONS

Netmanias, "LTE Security II: NAS and AS Security", http://www.netmanias.com/en/post/techdocs/5903/lte-security-ii-nas-and- . . . , Jan. 27, 2015, 16 pages.

Bluetooth, "SIM Access Profile (SAP)", https://developer.bluetooth.org/TechnologyOverview/Pages/SAP.aspx, Jan. 27, 2015, 1 page.

Skyroam, "Gmate+", http://www.skyroam.com/skyroam/index.php?option=com_content&view=article&id=44&l, Jan. 8, 2015, 3 pages.

3GPP, "3rd Generation Partnership Project; Technical Specification Group Services and System Aspects; 3GPP System Architecture Evolution (SAE)", 3GPP TS 33.401, V12.13.0, Dec. 2014, 131 pages.

* cited by examiner

METHOD AND APPARATUS FOR OPERATING A USER CLIENT WIRELESS COMMUNICATION DEVICE ON A WIRELESS WIDE AREA NETWORK

CROSS-REFERENCE TO RELATED APPLICATIONS

This application is related to an application entitled "A Method and Apparatus for Operating a User Client Wireless Communication Device on a Wireless Wide Area Network," Motorola Mobility Ser. No. 14/608,282, filed on Jan. 29, 2015 herewith and commonly assigned to the assignee of the present application, which is hereby incorporated by reference.

BACKGROUND

1. Field

The present disclosure is directed to a method and apparatus for operating a user client wireless communication device on a wireless wide area network. More particularly, the present disclosure is directed to operating a user client wireless communication device on a wireless wide area communication network without using a user wireless wide area communication device as a server.

2. Introduction

Presently, user client wireless communication devices use user wireless wide area communication devices to communicate with a wireless wide area communication network. For example, a user must use a smartphone to send and receive the information over a wireless wide area network for a smart watch when the smart watch itself lacks the ability to communicate directly over the wireless wide area communication network (e.g. due to the smart watch not having security credentials to do so). Such information can be information related to phone calls, text messages, e-mail messages, notifications, and other information that is sent from and received by a smart watch. In such an instance, the smart watch connects to the smartphone using via local area communications, e.g., Bluetooth® or WiFi communications, and the smartphone relays the communication signals over the wireless wide area communication network.

To communicate over the wireless wide area communication network, the smartphone must employ security procedures using a secret key that is exclusively stored on a subscriber identity module on the smartphone. The smart watch must communicate over the wireless wide area communication network using the smartphone because the smart watch does not have its own subscriber identity module or secret key to communicate over the network. The smart watch must also be in close proximity to the smartphone in order to communicate with the smartphone using Bluetooth® or other short range communication signals to access the wireless wide area communication network. This creates a problem when the user wants to use the smart watch without bringing along the smartphone. For example, if the user wants to go for a run or go to the gym with the smart watch without the burden of also carrying the smartphone, the user will not be able to obtain wireless wide area network coverage. This is a direct result of the absence of the subscriber identity module in the smart watch because information stored exclusively in the subscriber identity module on the smartphone is used by a wireless wide area operator to authenticate the user over the serving wireless wide area communication network.

One possible option to overcome the lack of a subscriber identity module on the smart watch would be to use a subscriber identity module on the smart watch in addition to the subscriber identity module on the smartphone. However, this creates a burden on the user because the user must register and pay for the subscriber identity modules on both devices with a wireless wide area communication network service provider to access the wireless wide area communication network. This also creates a burden because the different subscriber identity modules on the different devices each have different associated phone numbers, which makes managing calls, voice mail, and messaging difficult for the user. This further creates a burden in that it increases the size of the smart watch to accommodate for the addition of the subscriber identity module. This even further creates a burden when the user has multiple client devices, such as a smart watch, smart glasses, headphones, and other client devices that can be coupled to a wireless wide area network communication device, the user would have to install separate subscriber identity modules on every device.

Because the subscriber identity module is for authenticating a user rather than a device, there is a need for a method and apparatus for operating a user client wireless communication device on a wireless wide area network when the user client wireless communication device cannot use a user wireless wide area network device to access the wireless wide area network.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Embodiments provide a method and apparatus for operating a user client wireless communication device on a wireless wide area network. According to a possible embodiment, a communication link can be established at the user client wireless communication device with a user wireless wide area network communication device. A random challenge and an authentication token can be received from a wireless wide area network. The random challenge and the authentication token can be sent to the user wireless wide area network communication device. At least one temporary wireless wide area network communication security key can be received from the user wireless wide area network communication device, where the at least one temporary wireless wide area network communication security key is for the wireless wide area network. The user client wireless communication device can operate on the wireless wide area network independent from the user wireless wide area network communication device by using the at least one temporary wireless wide area network communication security key from the user wireless wide area network communication device.

According to another possible embodiment, a communication link can be established at the user client wireless communication device with a user wireless wide area network communication device. At least one temporary wireless wide area network communication security key for a wireless wide area network can be requested from the user wireless wide area network communication device. The at least one temporary wireless wide area network communication security key can be received from the user wireless wide area network communication device. At least one count of a number of uplink non access stratum messages transmitted by the user wireless wide area network communication device can be received. The user client wireless communication device can operate on the wireless wide area network independent from the user wireless wide area network communication device by using the at least one temporary wireless wide area network communication security key from the user wireless wide area network communication device.

Figure 1:
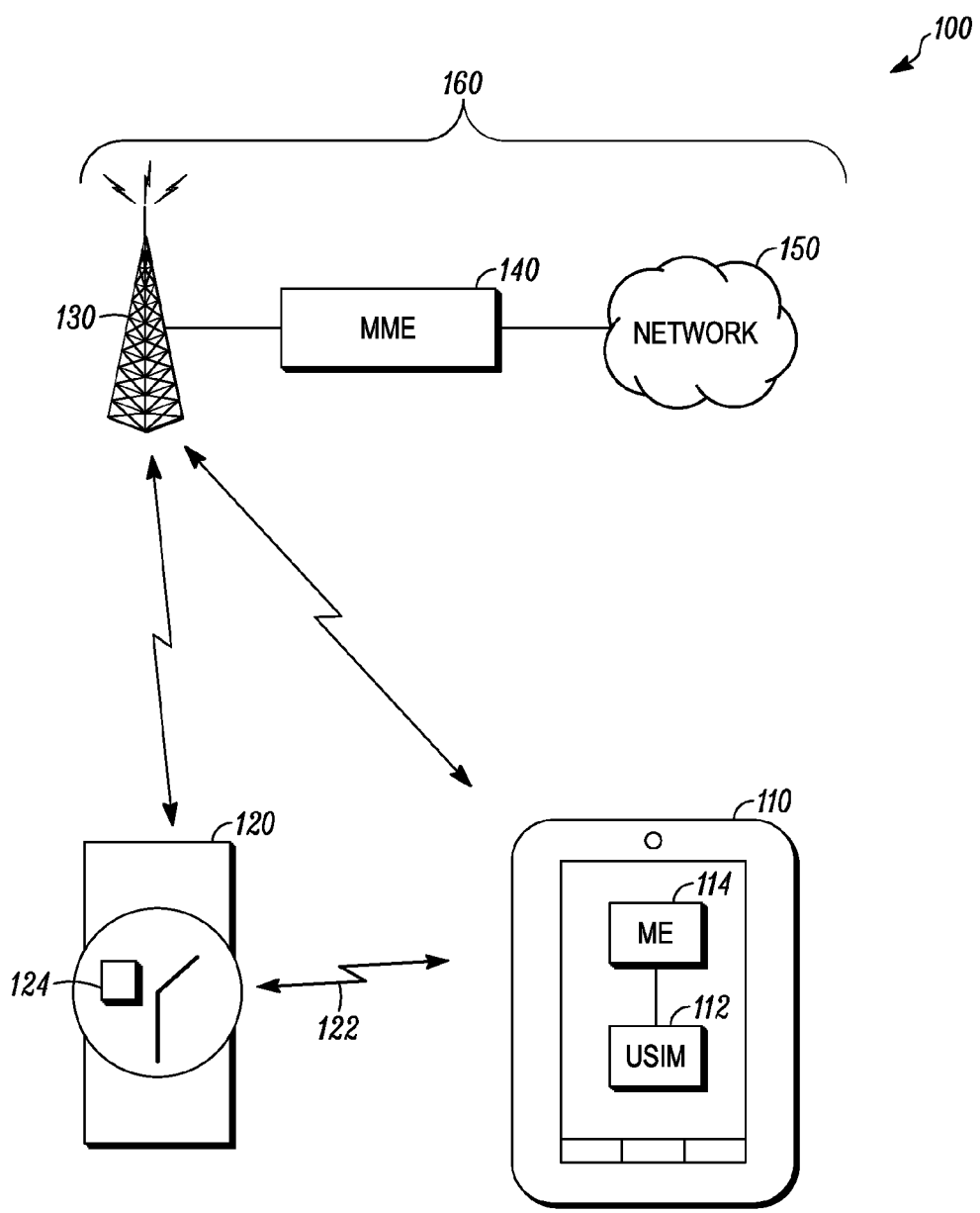
FIG. 1 is an example block diagram of a system according to a possible embodiment.

FIG. 1 is an example block diagram of a system 100 according to a possible embodiment. The system 100 can include a user wireless wide area network communication device, otherwise known as a user device 110, a user client wireless communication device, otherwise known as a client device 120, a base station 130, a Mobility Management Entity (MME) 140, and a network 150. While the base station 130 and the MME 140 are shown separate from the network 150, the base station 130, the MME 140, and the network 150 are all considered part of a Wireless Wide Area Network (WWAN) 160.

The user device 110 can be any device that can independently access a wireless wide area network by using credentials stored on the user device 110. For example, the user device 110 can be a wireless terminal, a portable wireless communication device, a smartphone, a cellular telephone, a flip phone, a personal digital assistant, device having a subscriber identity module, a personal computer having a cellular network access card, a selective call receiver, a tablet computer having a cellular network access card, or any other device that is capable of registering, sending communication signals, and receiving communication signals on a WWAN.

The WWAN 160 can include any type of network that is capable of sending and receiving WWAN communication signals. For example, the network 160 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, a satellite communications network, a high altitude platform network, and/or other WWAN communications networks.

In operation, the user device 110 can authenticate itself on the WWAN 160 to obtain access to the WWAN 160. For example, different security keys can be used for user/network authentication and security in a Universal Mobile Telecommunications System (UMTS)/Long Term Evolution (LTE) network. In an LTE embodiment, the user device 110 can be User Equipment (UE) that can include a Universal Subscriber Identity Module (USIM) that can have a secret key K. The same secret key K can be available at an operator's authentication center on the network 160. The secret key K may not be directly read from the USIM 112. The USIM 112 can take input parameters from the UE 110, perform computations using K, and return the results to the UE 110. The UE 110 can be considered as consisting of two components: the Mobile Equipment (ME) 114 circuitry and the USIM 112. An interface between the ME 114 and USIM 112 can be standardized and supports various commands and procedures that can enable the ME 114 to obtain parameters necessary for authentication and security from the USIM 112. The authentication procedure can be a procedure called Authentication and Key Agreement (AKA), which can involve a challenge/response mechanism. First, the MME 140 can send to the UE 110, i.e. ME 114 and the USIM 112, a random challenge RAND and an authentication token AUTN. Then, the USIM 112 in the UE 110 can check whether the AUTN token is acceptable. If it is acceptable, the USIM 112 can generate a response RES, which can be provided to the ME 114. The USIM 112 can also compute a Cipher Key (CK) and an Integrity Key (IK) from the secret key K. CK and IK can be available to the ME 114, as opposed to only being stored only in the USIM. The ME 114 can send a response message to the AKA challenge, which can include the RES, to the network 160. The ME can then use CK and IK to generate an Access Security Management Entity Key ($K_{ASME}$), which in turn can be used to generate other keys, such as for Non Access Stratum (NAS) encryption and integrity, for user plane and control plane encryption and integrity, and other keys. For example, an AKA procedure can be used to provide mutual authentication between the UE 110 and the network 160, and agreement on the $K_{ASME}$. The $K_{ASME}$ can form the basis for generation of Access Stratum (AS) and NAS ciphering and integrity keys to be used for AS Radio Resource Control (RRC) and user plane protection and NAS signaling protection, respectively. The $K_{ASME}$, CK, and IK can be stored in the ME 114 and can be used until there is a new AKA procedure.

Following the AKA procedure, a NAS Security Mode Command (SMC) procedure can be performed. In the NAS SMC procedure, the MME sends a NAS SMC message to the UE, which includes a NAS Message Authentication Code (NAS-MAC). The NAS-MAC is generated by first generating a NAS Integrity Key ($K_{NASint}$) based on the $K_{ASME}$, and generating the NAS-MAC based on the $K_{NASint}$ and NAS state parameters including a downlink NAS message count. In order to verify the integrity of the NAS-SMC message, the UE can generate its own version of the NAS-MAC, by first generating the $K_{NASint}$ based on the stored $K_{ASME}$ and then generating the NAS-MAC based on the $K_{NASint}$ and NAS state parameters including the downlink NAS message count. If the NAS-MAC generated by the UE is identical to the NAS-MAC included in the NAS-SMC message, the NAS-SMC message is considered verified. The UE then sends a NAS SMC complete message to the MME, which includes a second NAS-MAC. The second NAS-MAC is computed by the UE based on the $K_{NASint}$ and NAS state parameters including the uplink NAS message count. In order to verify the integrity of the NAS-SMC complete message, the MME derives its own version of the NAS-MAC. If the second NAS-MAC derived by the MME is identical to the NAS-MAC sent by the UE, the NAS-SMC complete message is considered verified and the NAS SMC procedure is complete. The NAS SMC procedure also generates a NAS encryption key ($K_{NASenc}$). The NAS encryption and integrity keys can be used for NAS layer communication to protect NAS information against fake base stations.

Along with the NAS SMC procedure a base station (eNB) specific key ($K_{eNB}$) can be generated. $K_{eNB}$ can be used to generate other keys for encryption and integrity protection of the link between the UE 110 and the eNB 130. Also along with the NAS SMC procedure, an AS SMC procedure can be performed. In the AS SMC procedure, the eNB sends the UE an AS SMC message which includes a Message Authentication Code-Integrity (MAC-I). The MAC-I is generated by receiving the $K_{eNB}$ from the MME, deriving a Radio Resource Control Integrity Key ($K_{RRCint}$), and then deriving the MAC-I based on the $K_{RRCint}$ and Packet Data Convergence Protocol (PDCP) state parameters including a PDCP message count. In order to check the integrity of the AS SMC message, the UE can generate its own version of the MAC-I by first deriving the $K_{RRCint}$ based on the $K_{eNB}$, and then deriving the MAC-I based on the $K_{RRCint}$ and PDCP state parameters including a PDCP message count. The AS SMC message is considered verified if the MAC-I derived by the UE is identical to the MAC-I included in the AS SMC message. The UE then sends a AS SMC Complete message to the eNB, which includes a second MAC-I. The second MAC-I is generated in the same manner as the MAC-I in the AS SMC message. The eNB generates its own version of the second MAC-I. If the MAC-I generated by the eNB is identical to the MAC-I included in the AS SMC Complete message, the AS SMC Complete message is considered verified and the AS SMC procedure is complete. A new $K_{eNB^*}$ can be generated at handover to a new base station using the current $K_{eNB}$ or another parameter Next Hop (NH), which can be generated from $K_{ASME}$ and $K_{eNB}$.

The AKA challenge can be performed for registration of a user in a serving network, for Location update/Tracking area update, for an Attach Request, and for a Detach Request. Mobility events, such as handover and cell reselection, may not necessitate generating a new $K_{ASME}$. The AKA challenge and the generation of a new $K_{ASME}$ can be infrequent, and if the UE 110 does not change MMEs, such as from MME 140 to another MME, an AKA challenge may not be triggered. However, the operator of the network 160 may have the option to perform an AKA challenge to the UE 110 at any time. Additionally, the SMC procedure can be performed at connection establishment and connection reestablishment.

The client device 120 can be any device that uses credentials of a user wireless wide area network communication device, such as the user device 110, to access a wireless wide area network. For example, the client device 120 can be a user portable client wireless communication device, such as a smart watch, smart glasses, or headphones, can be any other corresponding wearable device, can be a portable device, such as a portable music player, tablet, or laptop, can be a mobile device, such as a car with wireless capabilities, or can be any other client device that uses credentials of a user wireless wide area network communication device to access a wireless wide area network.

According to a possible embodiment, the user device 110 can be a smartphone including a subscriber identity module secret key that is used to generate at least one temporary wireless wide area network communication security key. The client device 120 can be a user portable device that connects with the smartphone using a communication link, such as a short range communication link, receives information regarding wireless wide area network communications from the smartphone over the short range communication link, and provides the received information to a user. For example, the received information can include text messages, caller identifier information, phone call communications, weather information, and other information that can be obtained over a wireless wide area network.

According to a related embodiment, the client device 120 can function as a user device on the network 160 using the same USIM 112 credentials as the user's user device 110 and continue to operate on the network 160 even when not directly connected to the user device 110 via a physical or wireless link.

Figure 2:
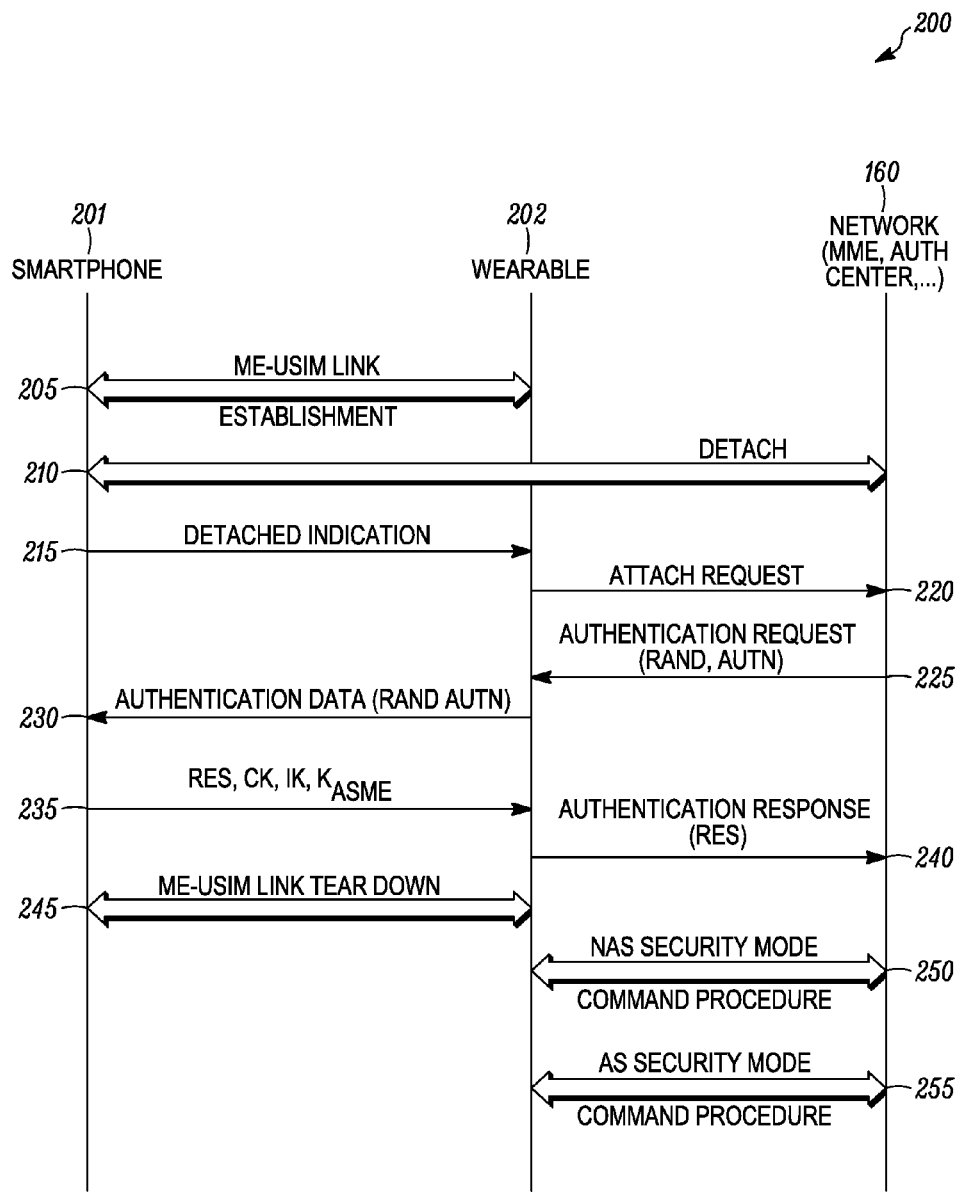
FIG. 2 is an example signal flow diagram according to a possible embodiment.

FIG. 2 is an example signal flow diagram 200 according to a possible embodiment. The signal flow diagram 200 illustrates signals for performing an AKA procedure at network access initialization between the user device 110 in the form of a smartphone 201, the client device 120 in the form of a wearable wireless communication device 202, such as a smart watch, and the network 160. While the diagram 200 illustrates a smartphone 201 and a wearable 202, the process can be used between any user device and client device so the client device can operate on a wireless wide area network using credentials from the user device. At 205, a connection link can be established between the wearable 202 and the smartphone 201 including the ME 114 and the USIM 112 as shown on the user device 110. The wearable 202 can establish the link, the smartphone 201 can establish the link, an application can establish the link, or the link can otherwise be established. At 210, the smartphone 201 can detach from the network 160. At 215, the smartphone 201 can send an indication to the wearable 202 indicating that it has detached from the network 160. At 220, the wearable 202 can initiate a network attach procedure with the network 160. The network attach procedure can be initiated by transmitting, to the network 160, a message such as an Attach message, a Registration Request message, or a Location Area Update message. At 225, the network 160 can respond with an AKA challenge to the wearable 202, where the AKA challenge can be an authentication request including a random challenge RAND and an authentication token AUTN. At 230, the wearable 202 can send commands for WWAN access credentials over the connection to the smartphone 201, where the commands can include authentication data, such as the received AUTN and RAND. At 235, the smartphone 201 can direct its USIM to perform an authentication computation and can return WWAN access credentials including RES to the wearable 202. The WWAN access credentials can further include credentials needed to generate further keys, such as $K_{ASME}$, or CK and IK. At 240, the wearable 202 can respond to the AKA challenge from the network 160 with RES. At 245 the wearable 202 and the smartphone 201 can disconnect the communication link between each other. At 250, the wearable 202 can generate all other keys for communication over the network 160, such as AS and NAS ciphering and integrity keys, $K_{eNB}$, and other useful keys for communication over the network 160 and can engage in a NAS SMC procedure with the network 160. The $K_{ASME}$ received from the smartphone 201 can be used to derive the keys such as the $K_{NASint}$. At 255, the wearable 202 can engage in an AS SMC procedure with the network 160 and can operate on the network 160. The $K_{ASME}$ received from the smartphone 201 can be used to derive the keys such as the $K_{RRCint}$. Operation in the network 160 by the wearable can include operation in connected mode (for example, a voice or a data call) and operation in idle mode (for example, reception of broadcast data such as Multimedia Broadcast Multicast Service (MBMS)). At handover or reselection, the wearable 202 can generate a new $K_{eNB^*}$ or $K_{eNB}$ and continue connection.

Figure 3:
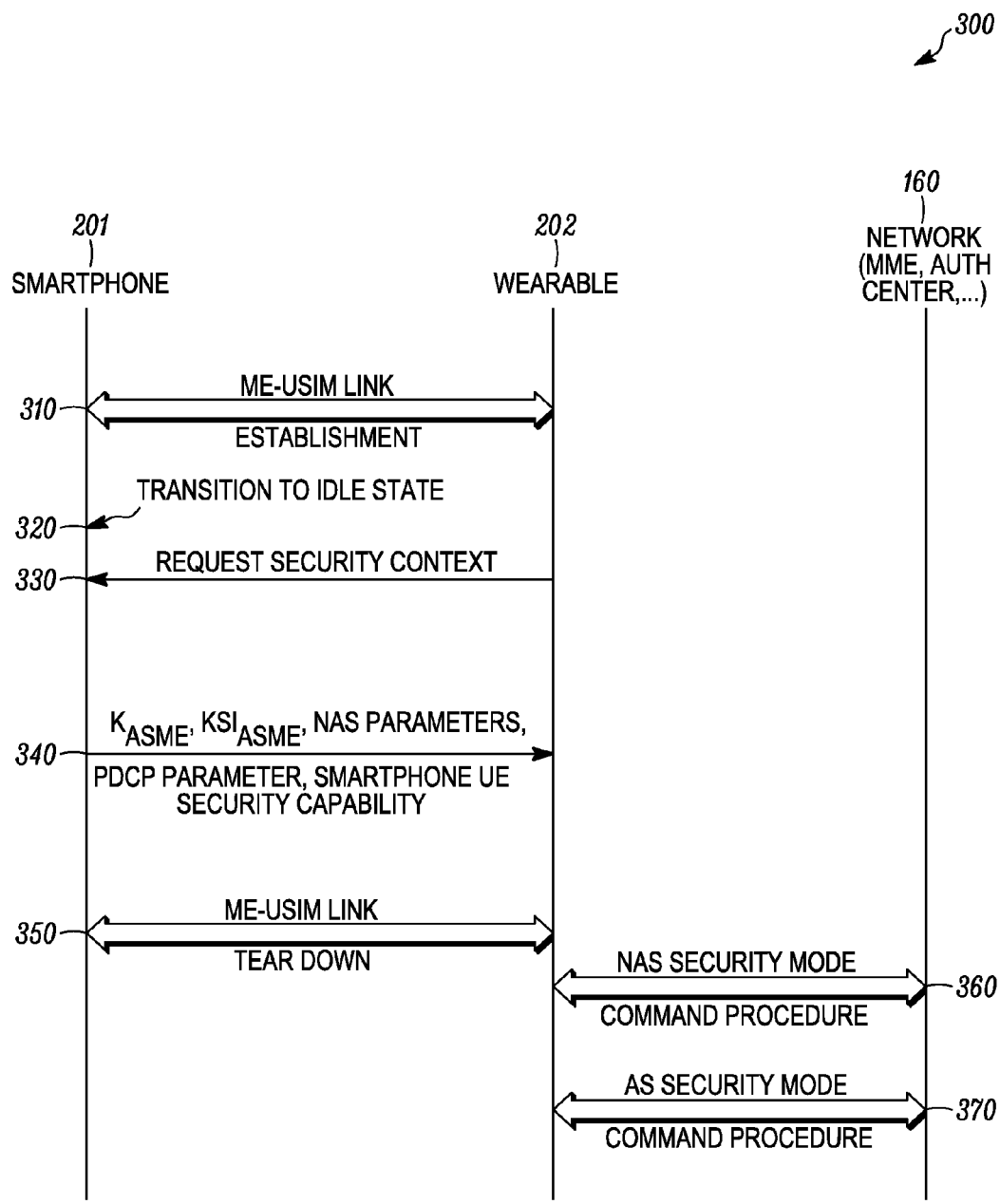
FIG. 3 is an example signal flow diagram according to a possible embodiment.

FIG. 3 is an example signal flow diagram 300 according to a possible embodiment. The signal flow diagram 300 illustrates signals for a process that does not require an AKA procedure at initialization between the user device 110 in the form of a smartphone 201, the client device 120 in the form of a wearable wireless communication device 202, and the network 160. While the diagram 300 illustrates a smartphone 201 and a wearable 202, the process can be used between any user device and client device so the client device can operate on a wireless wide area network using credentials from the user device. At 310, a connection link can be established between the wearable 202 and the smartphone 201 including the ME 114 and the USIM 112. At 320, the smartphone 201 can enter an idle state if it is not already in idle state while attached to the network 160. At 330, the wearable 202 can send commands over the connection to the smartphone 201 to request a security context. At 340, the security context parameters, such as $K_{ASME}$, $KSI_{ASME}$, EIA ID, EEA ID; NAS parameters, such as Uplink (UL) NAS count and Downlink (DL) NAS count; PDCP parameters, such as DL PDCP count; and smartphone User Equipment (UE) security capability information, and other security context parameters can be provided to the wearable 202. At 350, the wearable 202 can disconnect from the smartphone 201. At 360, the wearable 202 can perform a NAS SMC procedure. The $K_{ASME}$ received from the smartphone 201 can be used to derive the keys, such as the $K_{NASint}$, or alternatively, the $K_{NASint}$ can also be included in the security context parameters. The NAS-MACs can be derived from the $K_{NASint}$ and the NAS state parameters included in the security context parameters (such as the downlink NAS count and the uplink NAS count). At 370, the wearable 202 can perform an AS SMC procedure. The $K_{ASME}$ received from the smartphone 201 can be used to derive the keys, such as the $K_{RRCint}$, or alternatively, the $K_{RRCint}$ can be included in the security context parameters. The MAC-I can be derived from the $K_{RRCint}$ and the PDCP state parameters included in the security context (such as the Downlink PDCP count). The wearable 202 can also generate $K_{eNB}$ for the cell it is camped on. At handover or reselection, the wearable 202 can generate a new $K_{eNB^*}$ or $K_{eNB}$ and continue connection.

Referring back to the system 100, a local communication link 122, such as a short range communication link, can be established between the client device 120 and the user device 110 using a physical connection, such as a USB connection, a IEEE 1394 connection, a 30-pin dock connection, an optical cable connection, or other physical connection, using an optical connection, such as an infrared connection, using a local wireless connection, such as Bluetooth®, using a Wireless Local Area Network (WLAN) connection, such as a WiFi connection link, or other local communication link where commands can be sent over the local communication link 122. Also, a remote communication link can be established over an Internet Protocol (IP) connection where the client device 120 can establish an encrypted IP connection with the user device 110 and implement commands over the encrypted IP connection.

According to a possible embodiment, when the client device 120 is not locally connected to the user device 110 and receives an AKA challenge from the network 160, the client device 120 can establish a connection to the user device 110 via a WiFi link using an encrypted IP connection. The connection via the WiFi link may be a connection from the client device 120 over WiFi and through the network 160 or other network and even via another WiFi link to the user device 110. The client device 120 can then send authentication commands including RAND and AUTN to the user device 110 over the WiFi link. The user device 110 can respond with RES, CK, IK and $K_{ASME}$ computed by the USIM 112. In this case, the user device 110 can be detached from the network 160. The client device 120 can then respond to the network AKA challenge with RES if the AKA challenge has not timed-out. If the AKA challenge has timed out, the client device 120 can reinitiate the AKA procedure, such as via a NAS attach, with the network 160 and can perform the preceding steps again. The client device 120 can then disconnect from the smartphone 110. Then client device 120 can then generate all of the other necessary keys for communicating over the network 160.

According to another possible embodiment, when the client device 120 is not in WiFi coverage and receives an AKA challenge from the network 160, it can be equipped with a second USIM card 124 or a software based USIM, a.k.a. soft USIM (not shown). This second USIM 124 can be at least capable of establishing a data connection. Although the client device 120 can have a USIM 124, the goal of the procedure can be to enable the client device 120 to use the same phone number as the one in the user device USIM 112 instead of the phone number associated with the second USIM 124. In this embodiment, the client device 120 may have a connection based on one of two USIMs at any given time. So it may not be possible to receive an AKA challenge from the network 160 and send authentication commands and receive authentication responses to and from the user device 110 in real time. When the client device 120 receives an AKA challenge from a first cellular network that it is operating on, which can be the same network 160 as the one that the USIM 112 in the user device 110 is tied to, the client device 120 can immediately disconnect from first cellular network. The client device 120 can then use the second USIM 124 to establish an IP based connection via a cellular link to a second cellular network. Note that this second cellular network may be the same as the first cellular network, but the connection can be based on a different identity associated with the second USIM 124. Alternately, the client device 120 can use the second USIM 124 to establish an IP based connection to a second cellular network that is different from the first cellular network. The client device 120 can then establish a connection to the user device 110 via the cellular link. The client device 120 can indicate to the user device 110, over the cellular link connection, a need for new security credentials. The user device 110 can disconnect the cellular link connection to the client device 120 and perform a NAS attach, triggering another AKA challenge. The user device 110 can perform the AKA procedure and then reestablish a connection to the client device 120. The remaining steps of the flow diagram 300 can then be performed with some minor modifications. For example, the client device 120 can send commands over the connection to the user device 110 to request a security context or alternatively this step can be skipped. The user device 110 can then provide $K_{ASME}$, $KSI_{ASME}$, EIA ID, EEA ID, and NAS parameters including UL NAS count and DL NAS count to the client device 120. The user device 110 can also provide PDCP parameters, such as DL PDCP count to the client device 120. Note that it may be important to transfer the correct values for the NAS and PDCP counts to the client device 120. For example, given that NAS and PDCP counts can change when the user device 110 is transmitting and receiving data, it may be necessary to ensure that the client device 120 uses the same value of the counts that the user device 110 would have used. The user device 110 can also provide its security capability information to the client device 120. The client device 120 can then generate $K_{eNB}$ for the cell it is camped on, as well as disconnect from the user device 110 and disconnect cellular link to the user device 110. The client device 120 can then reestablish a connection to the network 160 as needed. At connection establishment, when a SMC procedure is triggered, the user device 120 can use security parameters, such as UL NAS count, DL NAS count and DL PDCP count, obtained from user device 110. At handover or reselection, the client device 120 can generate the new $K_{eNB*}$ or $K_{eNB}$ and continue connection.

To ensure that at any given time that one of the user device 110 or the client device 120, but not both, are engaged in a cellular connection using the USIM in the user device 110, a handshake procedure can be implemented to allow one of the two devices to begin using the USIM 112 credentials. When the user device 110 or the client device 120 yields control of the USIM, in some cases it may need to perform a detach from the network 160, such as shown in signal flow diagram 200. In all cases it may need to stop transmitting to the network 160.

In a case where the client device 120 is lost or stolen or when the battery power in the client device 120 is depleted, failsafe mechanisms to return control to the user device 110 can be used. For example, control can automatically return to the user device 110 after a fixed amount of time, even if there is no connection between the user device 110 and the client device 120 when the fixed amount of time expires. Alternatively, periodic "heartbeat" messages between the client device 120 and the user device 110 can be transmitted over the communication link 122, such that if no heartbeat messages are detected by the user device 110 for a predefined duration, control can automatically return to the user device 110.

If the approach of signal flow diagram 300 is used, i.e., the client device 120 uses keys and other parameters generated by the USIM in the user device 110 without engaging in a new AKA procedure, it is possible to have both the client device 120 and the user device 110 ring in response to an incoming call or message. In this case, the user device 110 and the client device 120 may be close to each other and the user may be able to pick up either one. In such a case, the user device 110 and the client device 120 can establish a ME-USIM connection. In this scenario, the client device 120 can be registered on the network 160 and the user device 110 can be in idle mode. If there is no ME-USIM connection between the client device 120 and the user device 110, the two may not perform simultaneous ringing. In this case, the device that is registered with the network can send parameters related to page message reception to the other device over the ME-USIM connection, in addition to providing security keys as described previously. For example, if the client device 120 is registered with the network 160, it can send parameters related to page reception to the user device 110. This can include parameters such as Temporary Mobile Subscriber Identity (TMSI) data, System Architecture Evolution-TMSI (S-TMSI), paging cycle duration, paging slot, and other parameters. The client device 120 can also provide updated parameters for the security procedures to the user device 110, such as the latest NAS counts. Both the user device 110 and the client device 120 can then monitor for paging messages. When the user answers the call on one of the two devices, there can be a handshake procedure between the two devices to ensure that the other device does not respond to the page. After the handshake procedure is completed, the device selected by the user can respond to the page and establish the call.

The ME-USIM link 122 can also be used to perform other actions, such as synchronizing call logs and Short Message Service (SMS) messages and information stored on a USIM between the user device 110 and the client device 120, synchronizing operator specific information such as minutes balance, and synchronizing network specific information, such as carrier frequency, Frequency Division Duplex (FDD) information, Time Division Duplex (TDD) information, and other information.

Figure 4:
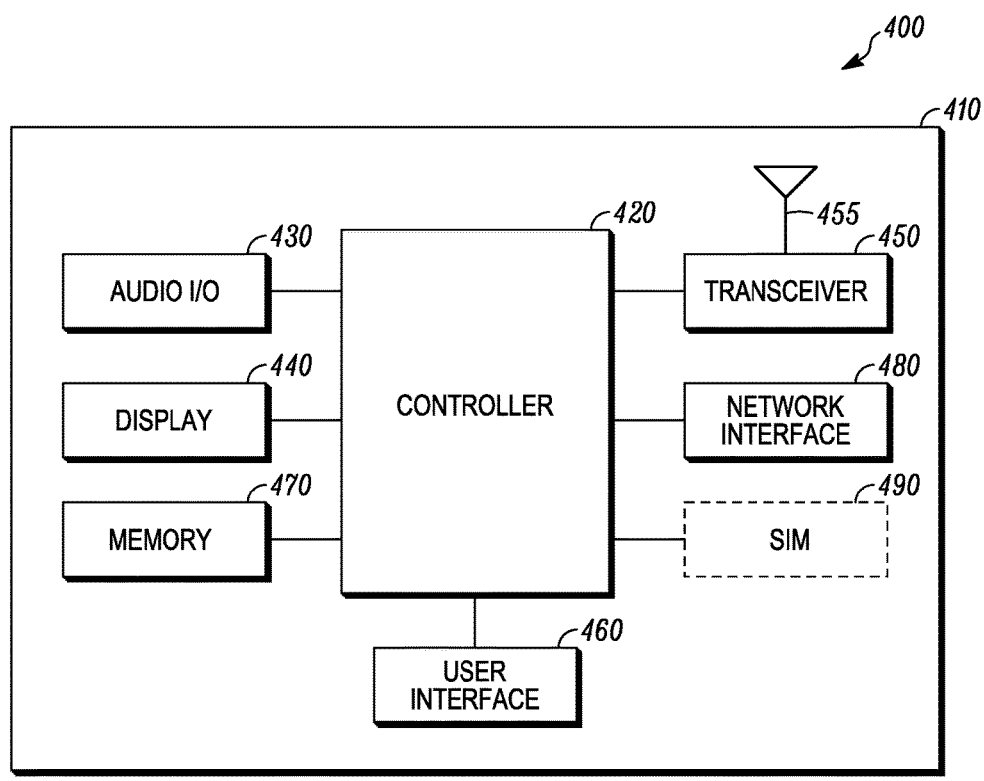
FIG. 4 is an example block diagram of an apparatus, such as a user device or client device, according to a possible embodiment.

FIG. 4 is an example block diagram of an apparatus 400, such as the user device 110 or the client device 120, according to a possible embodiment. The apparatus 400 can include a housing 410, a controller 420 within the housing 410, audio input and output circuitry 430 coupled to the controller 420, a display 440 coupled to the controller 420, a transceiver 450 coupled to the controller 420, an antenna 455 coupled to the transceiver 450, a user interface 460 coupled to the controller 420, a memory 470 coupled to the controller 420, and a network interface 480 coupled to the controller 420. The apparatus 400 can also include a Subscriber Identity Module (SIM) 490, such as a USIM. The apparatus 400 can perform the methods described in all the embodiments.

The display 440 can be a viewfinder, a liquid crystal display (LCD), a light emitting diode (LED) display, a plasma display, a projection display, a touch screen, or any other device that displays information. The transceiver 450 can include a transmitter and/or a receiver. The audio input and output circuitry 430 can include a microphone, a speaker, a transducer, or any other audio input and output circuitry. The user interface 460 can include a keypad, a keyboard, buttons, a touch pad, a joystick, a touch screen display, another additional display, or any other device useful for providing an interface between a user and an electronic device. The network interface 480 can be a universal serial bus port, an Ethernet port, an infrared transmitter/receiver, a USB port, an IEEE 1394 port, a WLAN transceiver, or any other interface that can connect an apparatus to a network or computer and that can transmit and receive data communication signals. The memory 470 can include a random access memory, a read only memory, an optical memory, a flash memory, a removable memory, a hard drive, a cache, or any other memory that can be coupled to a wireless communication device.

The apparatus 400 or the controller 420 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 470 or elsewhere on the apparatus 400. The apparatus 400 or the controller 420 may also use hardware to implement disclosed operations. For example, the controller 420 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 420 may be any controller or processor device or devices capable of operating an electronic device and implementing the disclosed embodiments.

In operation as a user client wireless communication device, such as the client device 120, according to a possible embodiment, the network interface 480 can be a communication interface configured to establish a communication link with a user wireless wide area network communication device, such as the user device 110. The network interface 480 can be a wired communication interface, such as a universal serial bus interface, a serial wire interface, a parallel wire interface, an Ethernet interface, or other wired interface, can be an optical interface, such as an infrared interface, can be a wireless interface, such as a Bluetooth® interface, a Wi-Fi interface, a wireless local area network interface, a cellular network interface, a satellite network interface, a wireless wide area network interface, or can be any other interface or combination of interfaces. The transceiver 450 can be a wireless wide area network transceiver that can receive a random challenge and an authentication token from a wireless wide area network. The transceiver 450 can also be the network interface that operates as the communication interface with the user wide area network communication device. The network interface 480 can then send the random challenge and the authentication token to the user wireless wide area network communication device, and can receive the at least one temporary wireless wide area network communication security key from the user wireless wide area network communication device. The at least one temporary wireless wide area network communication security key can be for the wireless wide area network and can be at least one key generated from a secret key present on the user wireless wide area network communication device. The controller 420 can then operate the user client wireless communication device on the wireless wide area network independent from the user wireless wide area network communication device by using the at least one temporary wireless wide area network communication security key from the user wireless wide area network communication device.

In operation as a user client wireless communication device, such as the client device 120, according to another possible embodiment, the network interface 480 can be a communication interface configured to establish a communication link with a user wireless wide area network communication device. The network interface 480 can send a request for at least one temporary wireless wide area network communication security key for a wireless wide area network from the user wireless wide area network communication device over the communication link. The network interface 480 can receive the at least one temporary wireless wide area network communication security key from the user wireless wide area network communication device. The network interface 480 can receive at least one count of a number of uplink non access stratum messages transmitted by the user wireless wide area network communication device. The transceiver 450 can be a wireless wide area network transceiver configured to send and receive signals over the wireless wide area network. The controller 420 can then operate the user client wireless communication device on the wireless wide area network via the wireless wide area network transceiver using the at least one temporary wireless wide area network communication security key from the user wireless wide area network communication device where the operation on the wireless wide area network is independent from the user wireless wide area network communication device. The controller 420 can also perform non-access stratum and access stratum security procedures with the wireless wide area network based on the at least one temporary wireless wide area network communication security key.

In operation as a user wireless wide area network communication device, such as the user device 110, according to a possible embodiment, the network interface 480 can be a communication interface configured to establish at the user wireless wide area network communication device, a communication link with a user client wireless communication device, such as the client device 120. The network interface 480 can receive a random challenge and an authentication token for a wireless wide area network from the user client wireless communication device over the communication link while the user wireless wide area network communication device is detached from the wireless wide area network. The network interface 480 can send an indication that the user wireless wide area network communication device is detached from the wireless wide area network to the client wireless communication device prior to receiving the random challenge and the authentication token. The controller 420 can generate a response to the random challenge. Then, the network interface 480 can send the response to the random challenge to the user client wireless communication device. The controller 420 can also generate at least one temporary wireless wide area network communication security key from a secret key present on the user wireless wide area network communication device. Then, the network interface 480 can send the at least one temporary wireless wide area network communication security key to the user client wireless communication device.

In operation as user wireless wide area network communication device, such as the user device 110, according to another possible embodiment, the network interface 480 can be a communication interface that can establish at the user wireless wide area network communication device, a communication link with a user client wireless communication device, such as the client device 120. The network interface 480 can receive a request for at least one temporary wireless wide area network communication security key for a wireless wide area network from the user client wireless communication device over the communication link. The controller 420 can generate the at least one temporary wireless wide area network communication security key. The controller 420 can generate the at least one temporary wireless wide area network communication security key from a secret key present on the user wireless wide area network communication device. The network interface 480 can send, to the user client wireless communication device, the at least one temporary wireless wide area network communication security key from the user wireless wide area network communication device in response to receiving the request, where the at least one temporary wireless wide area network communication security key can be for the wireless wide area network. The network interface 480 can also send, to the user client wireless communication device, at least one count of a number of uplink non access stratum messages or a count of a downlink non access stratum messages, or both, transmitted by the user wireless wide area network communication device in response to receiving the request.

Figure 5:
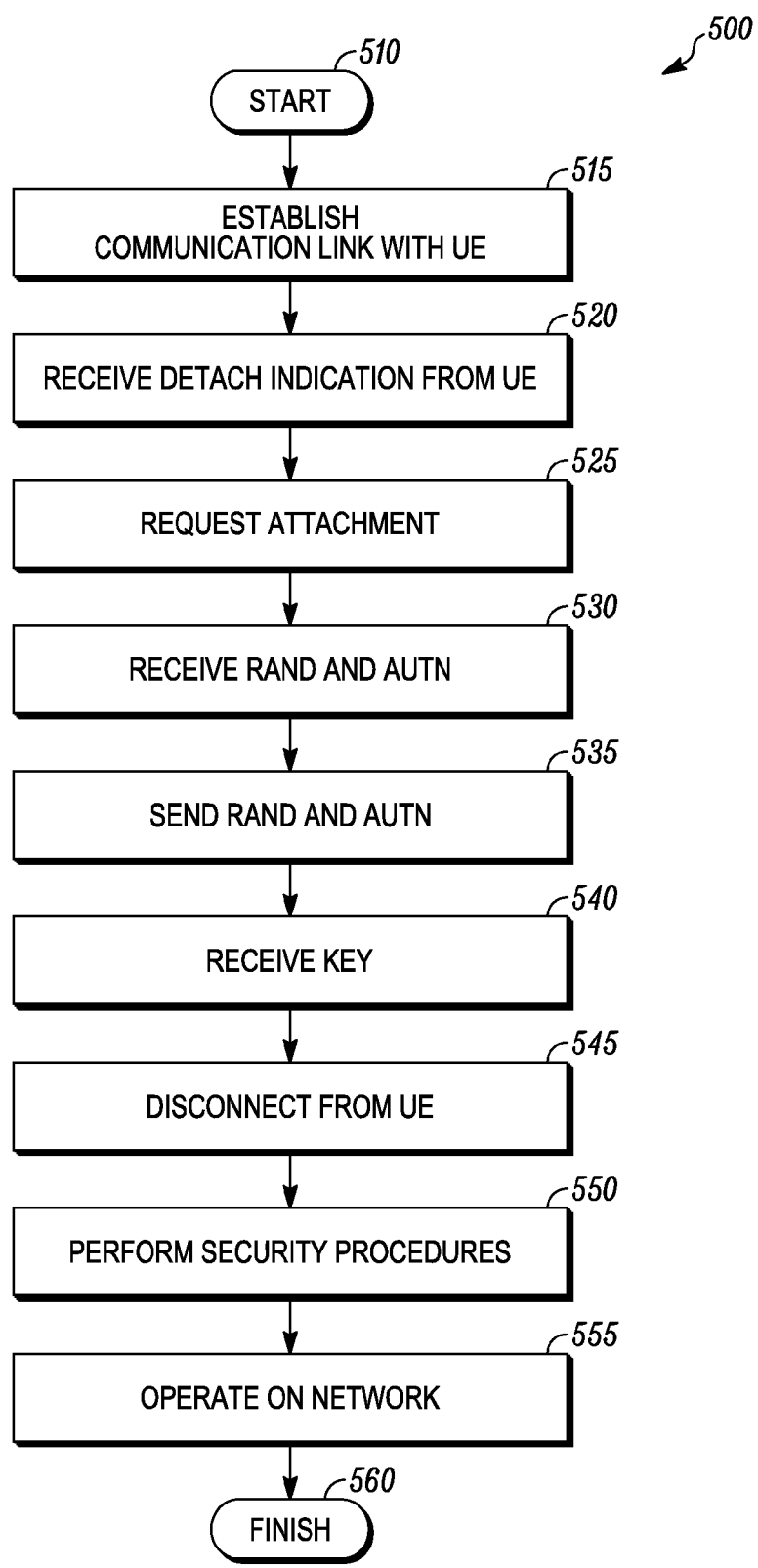
FIG. 5 is an example flowchart illustrating the operation of a user client wireless communication device according to a possible embodiment.

FIG. 5 is an example flowchart 500 illustrating the operation of a user client wireless communication device, such as the client device 120, according to a possible embodiment. For example, the flowchart 500 can correspond to the operations performed in the signal flow diagram 200. At 510, the flowchart 500 can begin.

At 515, a communication link with a user wireless wide area network communication device, such as the user device 110, can be established with the user client wireless communication device. In all embodiments, the communication link can be initiated by either the client device or the user device. The communication link can be short range communication link, such as a Bluetooth® link, a Wi-Fi link, a wired link, or any other short range communication link. The communication link can also be a long range communication link, such as over the Internet, over a wireless wide area network communications network, over an Internet Protocol (IP) communication link, or over any other long range communication link. Establishing the communication link can include establishing at the user client wireless communication device, an encrypted communication link with a user wireless wide area network communication device over a wireless local area network.

At 520, an indication can be received that indicates the user wireless wide area network communication device has detached from the wireless wide area network prior to operating the user client wireless communication device on the wireless wide area network using at least one temporary wireless wide area network communication security key.

At 525, the user client wireless communication device can attempt to attach to the wireless wide area network. The user client wireless communication device can do this by transmitting a message such as an Attach Request message or a Registration message to the network. At 530, a random challenge and an authentication token can be received from a wireless wide area network, such as the network 160. At 535, the random challenge and the authentication token can be sent to the user wireless wide area network communication device.

At 540, the at least one temporary wireless wide area network communication security key can be received from the user wireless wide area network communication device, where the at least one temporary wireless wide area network communication security key can be for the wireless wide area network. The at least one temporary wireless wide area network communication security key can be at least one key generated from a secret key present on the user wireless wide area network communication device. For example, the at least one temporary wireless wide area network communication security key can be a cipher key, an integrity key, and/or an access security management key generated from a secret key present on the user wireless wide area network communication device. The at least one temporary wireless wide area network communication security key can also be any other temporary encryption key generated on the user wireless wide area network communication device to operate on a wireless wide area network. The user client wireless communication device can store the received at least one temporary wireless wide area network communication security key in memory of the user client wireless communication device. The user wireless wide area network communication device can also send a response to the random challenge to the user client wireless communication device while providing the at least one temporary wireless wide area network communication security key to the user client wireless communication device. The user client wireless communication device can then send the response to the random challenge to the wireless wide area network.

At 545, the communication link can be detached from the user wireless communication device. At 550, NAS and AS security procedures can be performed with the wireless wide area network based on the at least one temporary wireless wide area network communication security key.

At 555, the user client wireless communication device can operate on the wireless wide area network using the at least one temporary wireless wide area network communication security key from the user wireless wide area network communication device, where the operation can be independent from the user wireless wide area network communication device. For example, the user client wireless communication device can operate on the wireless wide area network using the at least one temporary wireless wide area network communication security key from the user wireless wide area network communication device while all communication links between the user client wireless communication device and the user wireless wide area network communication device are disconnected.

The client device can establish communication link to the user wireless communication device in response to receiving an AKA challenge from the network. If the first authentication request has expired upon establishment of the communication link to the user wireless communication device, a new authentication procedure can be initiated by re-requesting attachment to the wireless wide area network and repeating authentication. For example, a first authentication request can be received from the wireless wide area network. A determination can be made that the first authentication request has expired after receiving the first authentication request. A new authentication procedure can be initiated with the wireless wide area network. Then a second authentication request can be received. Authentication parameters corresponding to the second authentication request can be sent to the user wireless wide area network communication device. An authentication response can be received from the user wireless wide area network communication device. Then, the authentication response can be sent to the wireless wide area network. At 560, the flowchart 500 can end.

Figure 6:
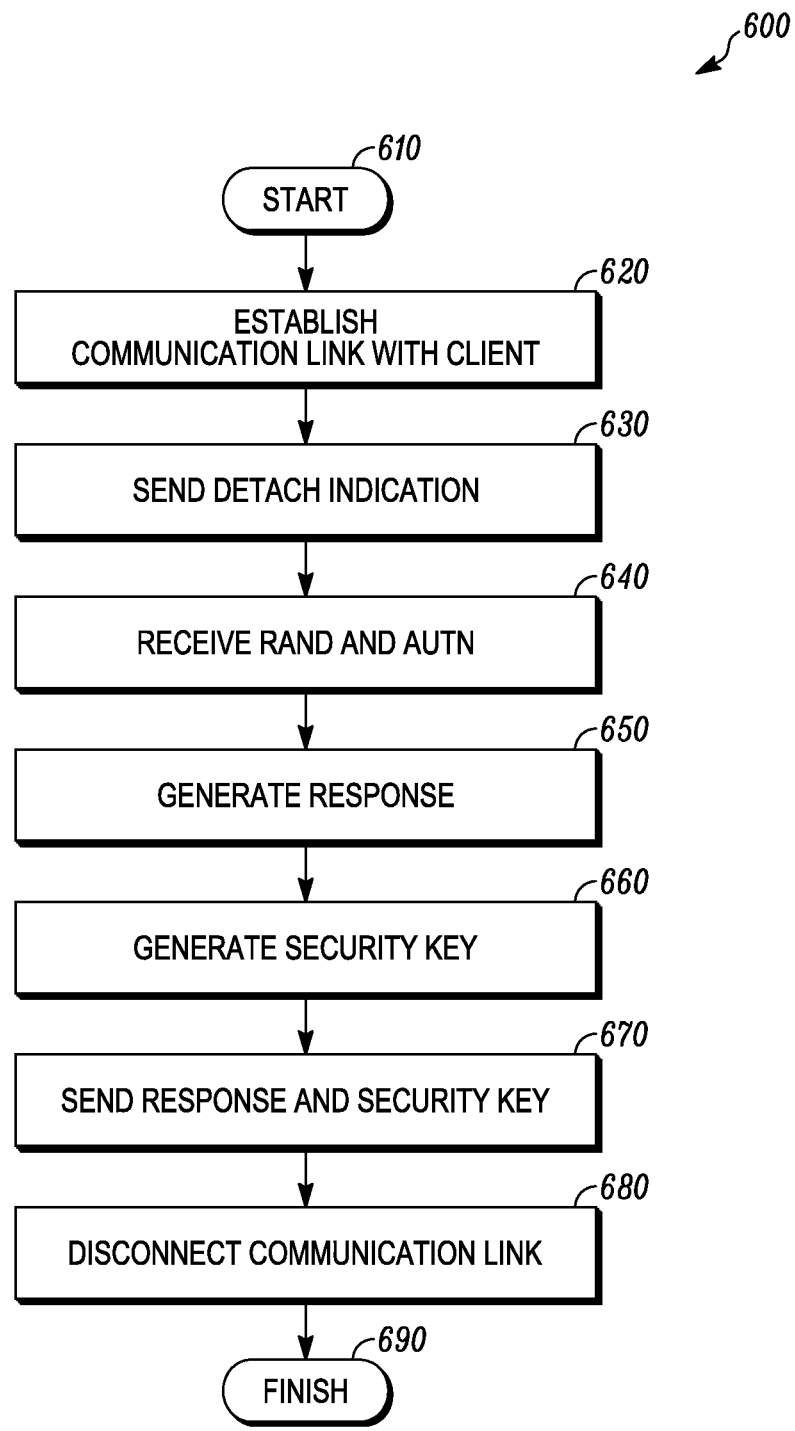
FIG. 6 is an example flowchart illustrating the operation of a user wireless wide area network communication device according to a possible embodiment.

FIG. 6 is an example flowchart 600 illustrating the operation of a user wireless wide area network communication device, such as the user device 110, according to a possible embodiment. For example, the flowchart 600 can correspond to the operations performed in the signal flow diagram 200. At 610, the flowchart 600 can begin. At 620, a communication link can be established at the user wireless wide area network communication device with a user client wireless communication device, such as the client device 120.

At 630, an indication that the user wireless wide area network communication device is detached from the wireless wide area network can be sent to the client wireless communication device prior to receiving the random challenge and the authentication token. For example, the user device can be operating on the wireless wide area network, detach from the wireless wide area network upon realizing the client device desires to operate on the wireless wide area network independent of the user device, and then send the indication of detachment to the client device. Alternately, the user device may not be operating on the wireless wide area network, such as in idle mode, when receiving an indication that the client device desires to operate on the wireless wide area network independent of the user device, and then the user device can send the indication of detachment to the client device to indicate it is not attached to the wireless wide area network.

At 640, a random challenge and an authentication token for a wireless wide area network can be received from the user client wireless communication device while the user wireless wide area network communication device is detached from the wireless wide area network. At 650, a response to the random challenge can be generated. At 660, at least one temporary wireless wide area network communication security key can be generated from a secret key present on the user wireless wide area network communication device. At 670, the response to the random challenge can be sent to the user client wireless communication device. The at least one temporary wireless wide area network communication security key can also be sent to the user client wireless communication device.

At 680, the communication link with the user client wireless communication device can be disconnected after sending the response to the random challenge to the user client wireless communication device. The user device can actively disconnect the communication link itself or passively disconnect the communication link when a user removes the link, the client device actively disconnects the link, or the client device moves out of range of the communication link. At 690, the flowchart 600 can end.

Figure 7:
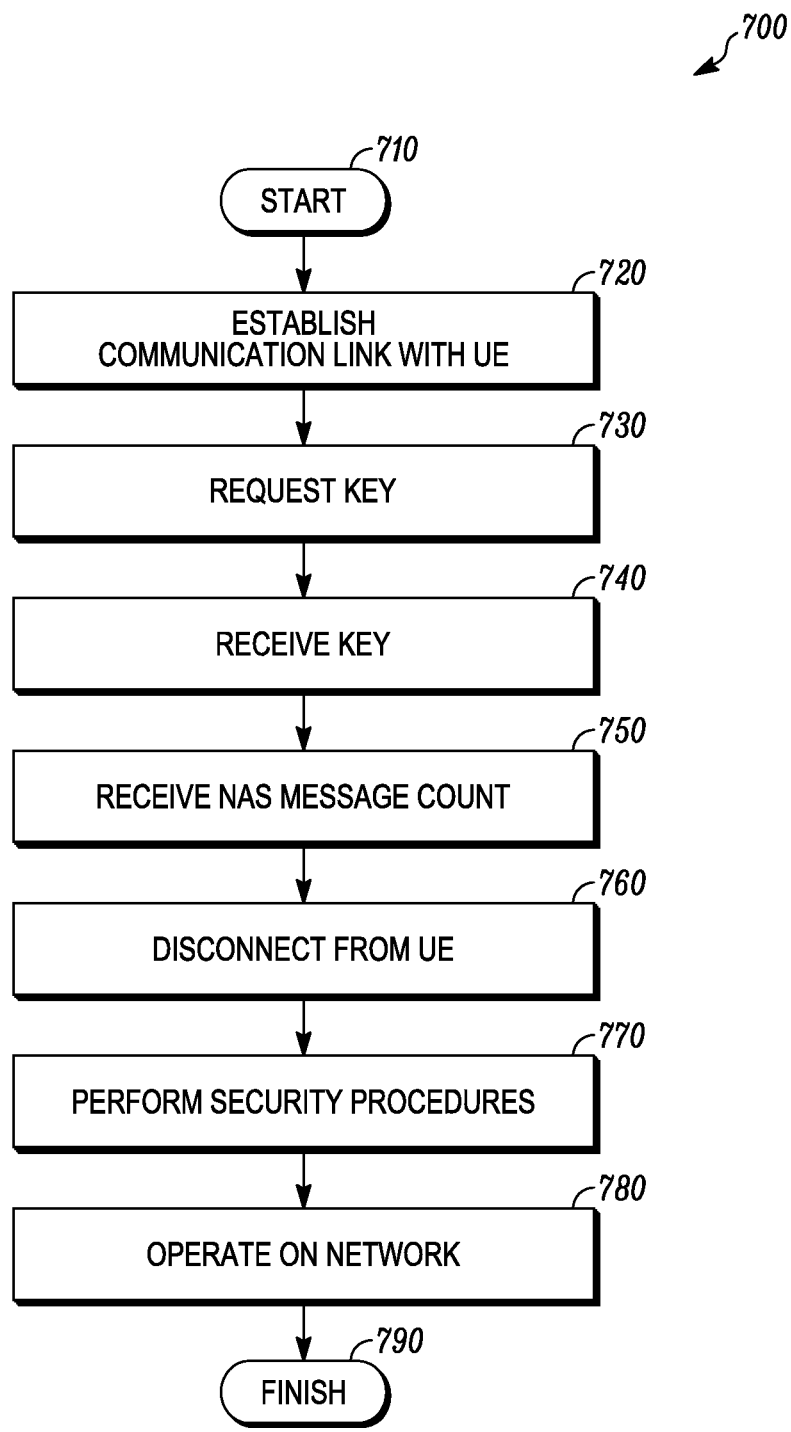
FIG. 7 is an example flowchart illustrating the operation of a user client wireless communication device according to a possible embodiment.

FIG. 7 is an example flowchart 700 illustrating the operation of a user client wireless communication device, such as the client device 120, according to a possible embodiment. For example, the flowchart 700 can correspond to the operations performed in the signal flow diagram 300. At 710, the flowchart 500 can begin.

At 720, a communication link can be established at the user client wireless communication device with a user wireless wide area network communication device. The communication link can be initiated by either the client device or the user device. The communication link can be short range communication link, such as a Bluetooth® link, a Wi-Fi link, a wired link, or any other short range communication link. The communication link can also be a long range communication link, such as over the Internet, over a wireless wide area network communications network, over an Internet Protocol (IP) communication link, or over any other long range communication link. The communication link can further be an encrypted communication link with a user wireless wide area network communication device over a wireless local area network. The encrypted communication link over the wireless local area network can include encrypted communications over a wireless wide area network.

At 730, at least one temporary wireless wide area network communication security key for a wireless wide area network can be requested from the user wireless wide area network communication device. The request for the at least one temporary wireless wide area network communication security key can be explicit or implicit. For example, a request to attach to a wireless wide area network can implicitly request a wireless wide area network communication security key. As another example, a request or message relating to aspects of a security context can implicitly request a wireless wide area network communication security key. Other requests or messages relating to a wireless wide area network can also implicitly request a wireless wide area network communication security key. The at least one temporary wireless wide area network communication security key can be at least one key generated from a secret key present on the user wireless wide area network communication device. For example, the at least one temporary wireless wide area network communication security key can be a cipher key, an integrity key, and/or an access security management key generated from a secret key present on the user wireless wide area network communication device. The at least one temporary wireless wide area network communication security key can also be any other temporary encryption key generated on the user wireless wide area network communication device to operate on a wireless wide area network. At 740, the at least one temporary wireless wide area network communication security key can be received from the user wireless wide area network communication device.

At 750, at least one count of a number of uplink non access stratum messages transmitted by the user wireless wide area network communication device can be received. The count of a number of uplink non access stratum messages transmitted by the user wireless wide area network communication device can indicate the number of uplink non access stratum messages transmitted by the user wireless wide area network communication device to the wireless wide area network. The user client wireless communication device can also receive other protocol state information along with the at least one count of a number of uplink non access stratum messages transmitted by the user wireless wide area network communication device. For example, the user client wireless communication device can also receive a count of a number of downlink non access stratum messages transmitted to the user wireless wide area network communication device from the wireless wide area network.

At 760, some or all communication links between the user client wireless communication device and the user wireless wide area network communication device can be disconnected. At 770, non-access stratum and access stratum security procedures can be performed with the wireless wide area network based on the at least one temporary wireless wide area network communication security key. For example, both the downlink non access stratum (DL NAS) count and the uplink non access stratum (UL NAS) count can be used to complete a NAS security mode command procedure with the wireless wide area network. As a further example, a MME can send a NAS SMC message in which it includes a NAS message authentication code. The message authentication code can be computed based on the DL NAS Count, as well as other NAS keys that it has generated. The user device can verify that the message authentication code sent by the network is correct by computing its own version of the message authentication code, such as by using the DL NAS count that it has. After that, the user device can send a response to the SMC message, where the response can be considered a security mode complete message. In this message, the user device can include a message authentication code that can be computed based on the UL NAS count. The MME can verify that the message authentication code sent by the user device is correct by computing its own version using the UL NAS count that it has.

At 780, the user client wireless communication device can operate on the wireless wide area network using the at least one temporary wireless wide area network communication security key from the user wireless wide area network communication device independent from the user wireless wide area network communication device. The user client wireless communication device can operate on the wireless wide area network while all communication links between the user client wireless communication device and the user wireless wide area network communication device are disconnected.

If the first authentication request has expired, a new authentication procedure can be initiated by re-requesting attachment to the wireless wide area network and repeating authentication. For example, a first authentication request can be received from the wireless wide area network. A determination can be made that the first authentication request has expired after receiving the first authentication request. A new authentication procedure can be initiated with the wireless wide area network. Then a second authentication request can be received. Authentication parameters corresponding to the second authentication request can be sent to the user wireless wide area network communication device. An authentication response can be received from the user wireless wide area network communication device. Then, the authentication response can be sent to the wireless wide area network. At 790, the flowchart 700 can end.

Figure 8:
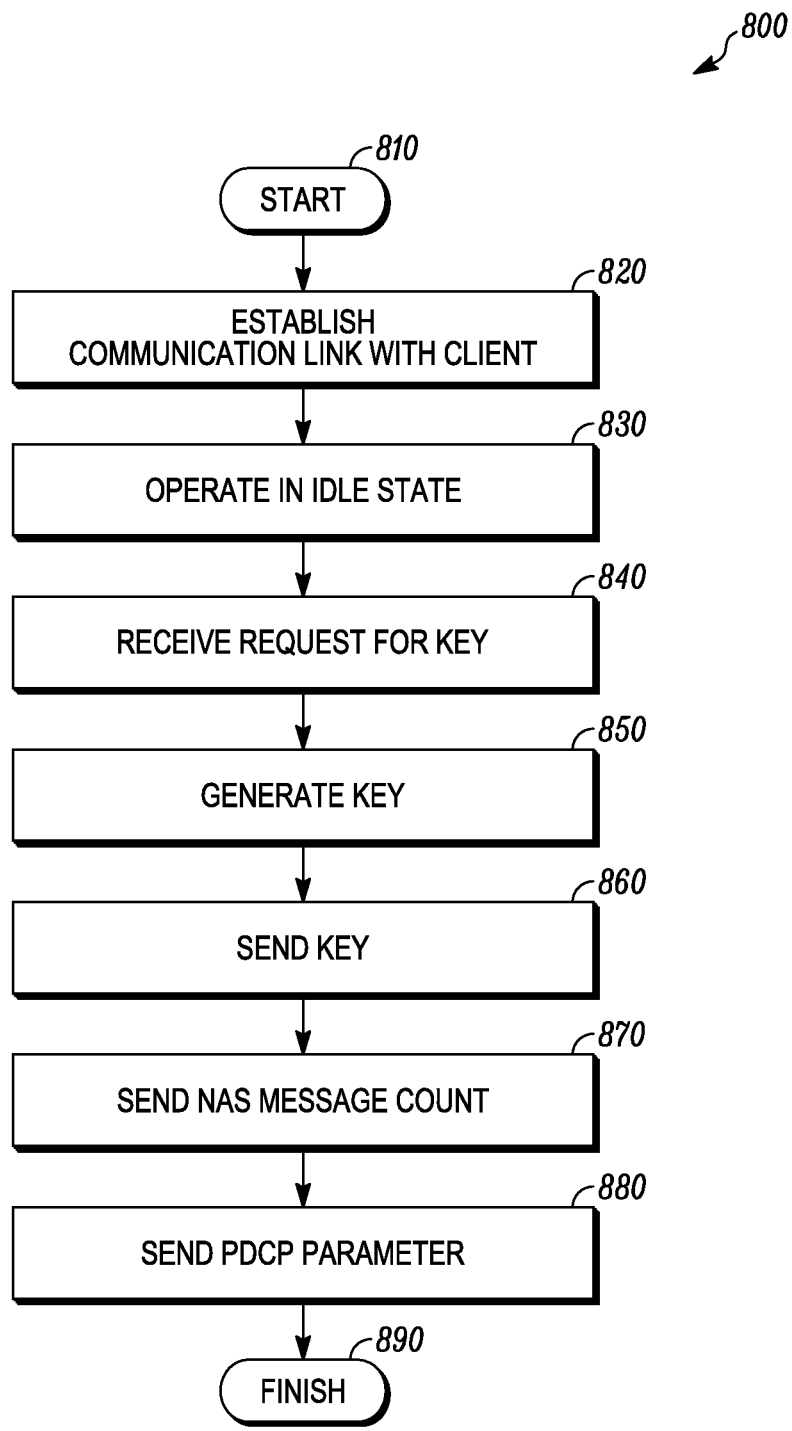
FIG. 8 is an example flowchart illustrating the operation of a user wireless wide area network communication device according to a possible embodiment.

FIG. 8 is an example flowchart 800 illustrating the operation of a user wireless wide area network communication device, such as the user device 110, according to a possible embodiment. For example, the flowchart 800 can correspond to the operations performed in the signal flow diagram 300. At 810, the flowchart 800 can begin. At 820, a communication link can be established with a user client wireless communication device.

At 830, the user wireless wide area network communication device can operate in an idle state on the wireless wide area network for the rest of the flowchart 800 after establishing a communication link with a user client wireless communication device. At 840, a request for at least one temporary wireless wide area network communication security key for a wireless wide area network can be received from the user client wireless communication device. A request for a security context for the wireless wide area network can also be received from the user client wireless communication device.

At 850, an at least one temporary wireless wide area network communication security key can be generated from a secret key present on the user wireless wide area network communication device. At 860, the at least one temporary wireless wide area network communication security key can be sent to the user client wireless communication device in response to receiving the request, where the at least one temporary wireless wide area network communication security key can be for the wireless wide area network.

At 870, at least one count of a number of uplink non access stratum messages transmitted by the user wireless wide area network communication device can be sent to the user client wireless communication device in response to receiving the request. The count of a number of uplink non access stratum messages transmitted by the user wireless wide area network communication device can indicate the number of uplink non access stratum messages transmitted by the user wireless wide area network communication device to the wireless wide area network. Additionally, a count of a number of downlink NAS messages received by the user wireless wide area communication device can also be sent. At 880, at least one packet data convergence protocol parameter can be sent to the user client wireless communication device responsive to receiving the request at 840. At 890, the flowchart 800 can end.

Figure 9:
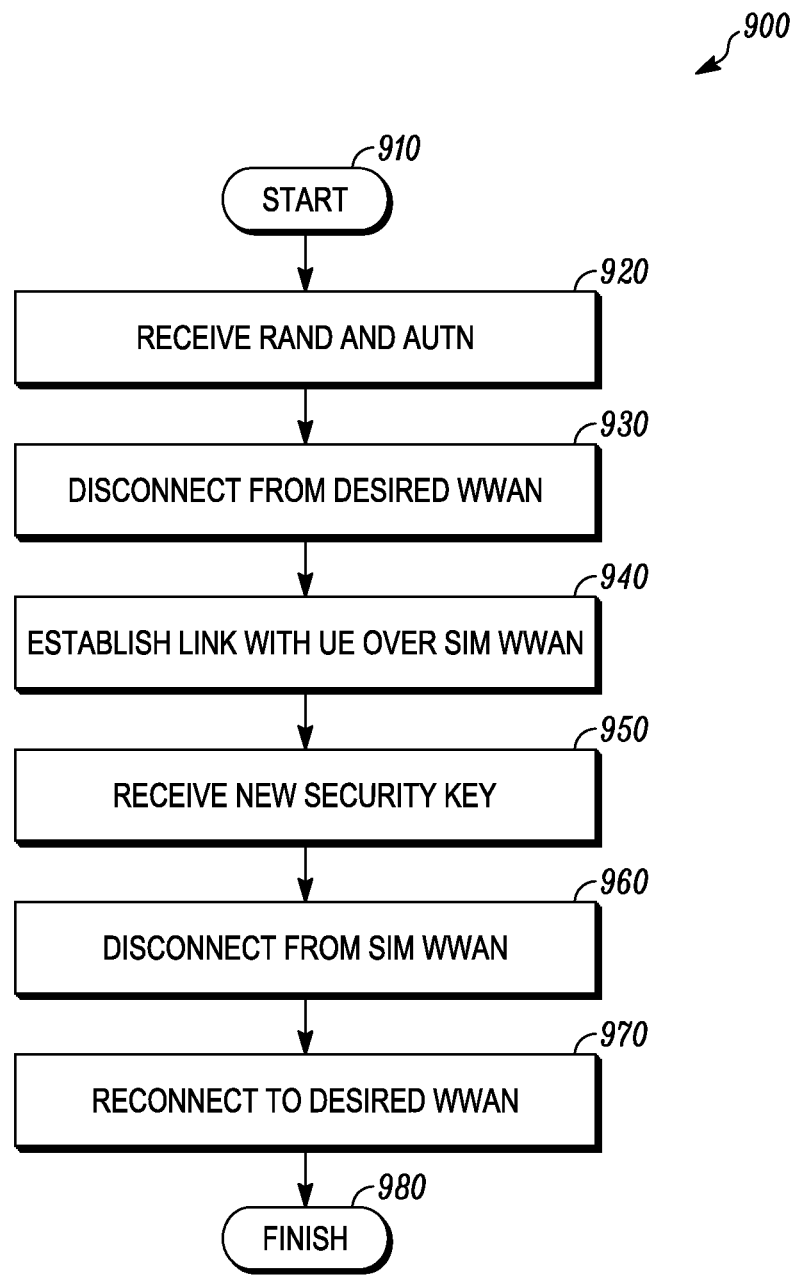
FIG. 9 is an example flowchart illustrating the operation of user client wireless communication device according to a possible embodiment.

FIG. 9 is an example flowchart 900 illustrating the operation of user client wireless communication device, such as the client device 120, according to a possible embodiment. The flowchart 900 depicts operations a user client wireless communication device with a separate subscriber identity module can perform if it receives an AKA challenge from a desired wireless wide area network it is operating on using the temporary wireless wide area network communication security key while it is remote from the corresponding user wireless wide area network communication device, such as the user device 110. The separate subscriber identity module can be a subscriber identity module that establishes a data connection over a wireless wide area network associated with the subscriber identity module. The wireless wide area network for the subscriber identity module on the user client wireless communication device can be the same network as the network for desired operation or can be a different network as the network for desired operation.

At 910, the flowchart 900 can begin. At 920, an authentication challenge can be received while operating on the desired wireless wide area network using the temporary wireless wide area network communication security key. At 930, operation on the desired wireless wide area network can be disconnected after receiving the authentication challenge.

At 940, a communication link can be established with a user wireless wide area network communication device over the wireless wide area network associated with the subscriber identity module. At 950, at least one other temporary wireless wide area network communication security key for the desired wireless wide area network can be received from the user wireless wide area network communication device over the wireless wide area network associated with the subscriber identity module. At 960, the communication link over the wireless wide area network associated with the subscriber identity module can be disconnected. At 970, the user client wireless communication device can reconnect to the desired wireless wide area network using the at least one other temporary wireless wide area network communication security key and perform NAS and AS security procedures with the network. At 980, the flowchart 900 can end.

Figure 10:
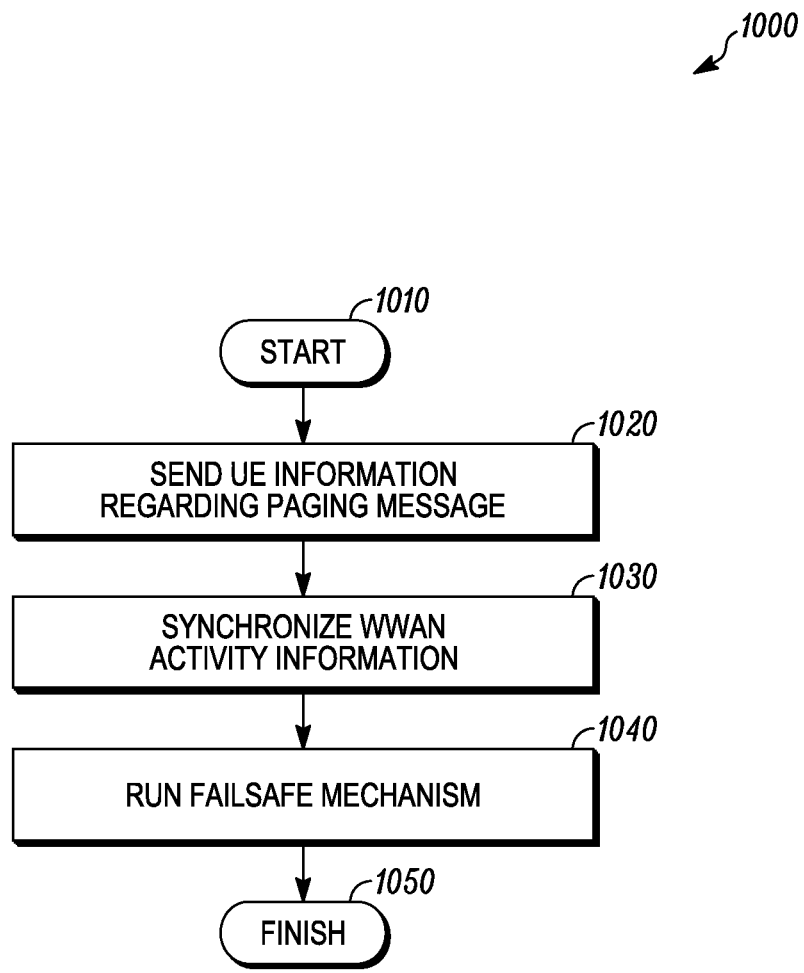
FIG. 10 is an example flowchart illustrating the operation of a user client wireless communication device according to a possible embodiment.

FIG. 10 is an example flowchart 1000 illustrating the operation of a user client wireless communication device, such as the client device 120, according to a possible embodiment. The operations of the flowchart 1000 can be performed while or after the user client wireless communication device is operating on a wireless wide area network using a temporary wireless wide area network communication security key. At 1010, the flowchart 1000 can begin.

At 1020, information regarding the paging information message for future pages can be sent from the user client wireless communication device to the user wireless wide area network communication device. This can enable the user device to also receive page messages destined for the client device. Parameters from the paging information message can be used by the user device to receive page messages intended for the client device.

At 1030, the user client wireless communication device can synchronize with the user wireless wide area network communication device, over a communication link with the user wireless wide area network communication device, information regarding activities over the wireless wide area network.

At 1040, a failsafe mechanism can run to return operation on the wireless wide area network to the user wireless wide area network communication device. The failsafe mechanism to run to return operation to a user wireless wide area network communication device in case the user client wireless communication device is lost or stolen or has insufficient battery charge for communication. For example, control can be returned to the user wireless communication device after a predetermined time, such as minutes, hours, or days after a temporary wireless wide area network communication security key is received from the user wireless communication device.

At 1050, the flowchart 1000 can end. While the flowchart 1000 shows different processes, such as paging message sharing, WWAN activity synchronization, and failsafe mechanism operation, in sequence, the different processes can be performed independently from each other and in difference sequences.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 11:
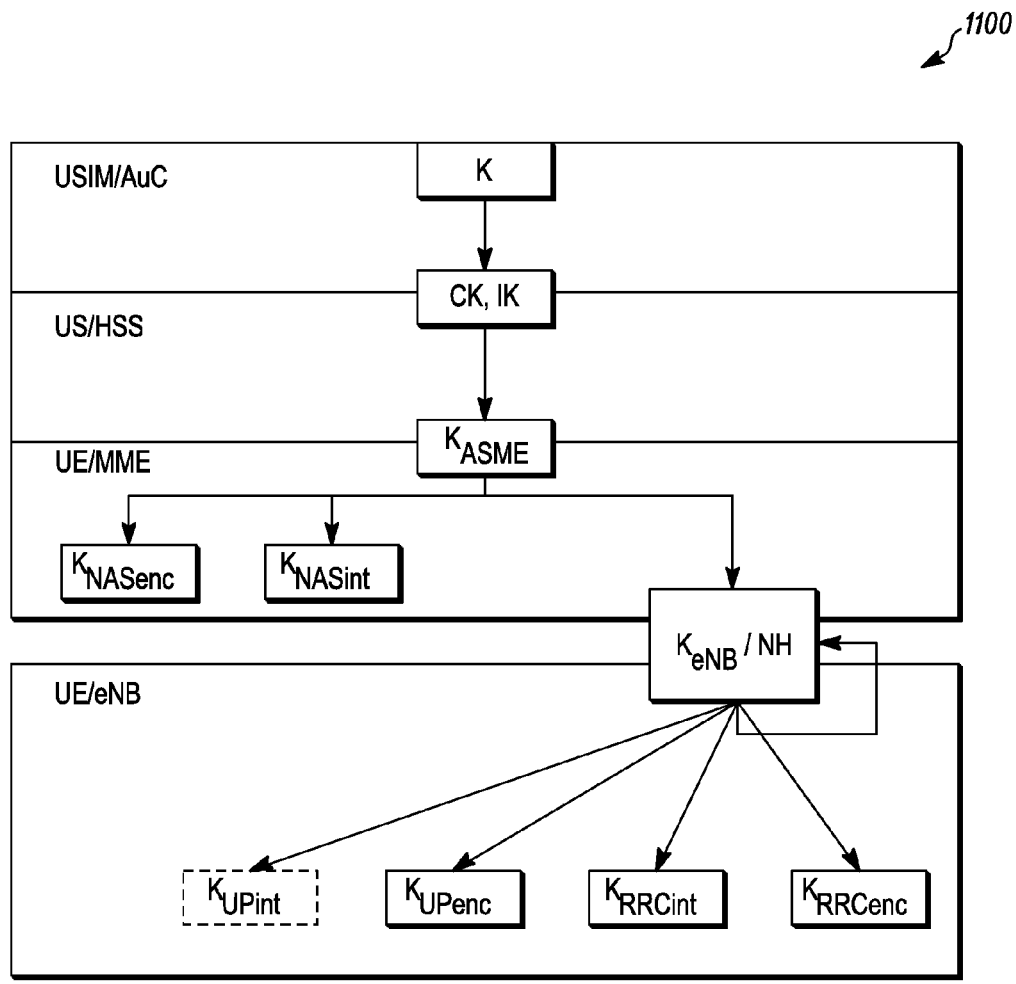
FIG. 11 is an example illustration of keys used by a network and user equipment.

FIG. 11 is an example illustration of keys used by a network, such as the network 160, and User Equipment (UE), such as the user device 110. The keys can include a secret key K located on the USIM 112 in the UE and at an Authentication Center (AuC) on the network 160. The secret key K can be used to generate CK and IK that can be located on the ME 114 of the user device 110, otherwise generally considered as being stored on the UE, and located at a Home Subscriber Server (HSS) on the network 160. CK and IK can be used to generate $K_{ASME}$ that is located on the UE and at the MME 140 on the network 160. $K_{ASME}$ can be used to generate $K_{NASenc}$ and $K_{NASint}$. $K_{ASME}$ can also be used to generate $K_{eNB}$ and Next Hop (NH) located on the UE and at a current eNB, such as the base station 130. $K_{eNB}$ and NH can be used to generate $K_{UPint}$, $K_{UPenc}$, $K_{RRCint}$, and $K_{RRCenc}$ located on the UE and on the eNB.

As all embodiments are relevant to operating a user client wireless communication on a wireless wide area network by using information generated by the user wireless wide area network communication device, elements from each embodiment are interchangeable. For example, authentication and key agreement procedures, random challenges, security mode command procedures, and other procedures can be interchanged, added, or removed in all embodiments. Also, different elements in the flowcharts and signal flow diagrams can be performed in the order shown or out of the order shown.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method in a user client wireless communication device, the method comprising:
    establishing at the user client wireless communication device, a communication link with a user wireless wide area network communication device;
    receiving a random challenge and an authentication token from a wireless wide area network;
    sending the random challenge and the authentication token to the user wireless wide area network communication device;
    receiving at least one temporary wireless wide area network communication security key from the user wireless wide area network communication device, where the at least one temporary wireless wide area network communication security key is for the wireless wide area network; and
    operating the user client wireless communication device on the wireless wide area network independent from the user wireless wide area network communication device by using the at least one temporary wireless wide area network communication security key from the user wireless wide area network communication device.

2. The method according to claim 1, wherein the at least one temporary wireless wide area network communication security key comprises at least one key generated from a secret key present on the user wireless wide area network communication device.

3. The method according to claim 2, wherein the at least one temporary wireless wide area network communication security key comprises at least one key generated from a secret key present on a removable module in the user wireless wide area network communication device.

4. The method according to claim 1, further comprising receiving an indication that the user wireless wide area network communication device has detached from the wireless wide area network prior to operating the user client wireless communication device on the wireless wide area network using the at least one temporary wireless wide area network communication security key.

5. The method according to claim 1, further comprising performing non-access stratum and access stratum security procedures with the wireless wide area network based on the at least one temporary wireless wide area network communication security key.

6. The method of claim 1, further comprising receiving broadcast services from the wireless wide area network based on the at least one temporary wireless wide area network communication security key when the user client wireless communication device is in an idle state.

7. The method according to claim 1, further comprising:
receiving a first authentication request from the wireless wide area network;
determining, when the communication link between the user client wireless device and the wireless wide area communication device is established, that the first authentication request has expired after receiving the first authentication request;
initiating a new authentication procedure with the wireless wide area network; and
receiving a second authentication request,
wherein sending the random challenge and the authentication token includes sending authentication parameters corresponding to the second authentication request to the user wireless wide area network communication device,
wherein receiving the at least one temporary wireless wide area network communication security key includes receiving an authentication response from the user wireless wide area network communication device, and
wherein the method further comprises sending the authentication response to the wireless wide area network.

8. The method according to claim 1, wherein establishing comprises establishing at the user client wireless communication device, an encrypted communication link with a user wireless wide area network communication device over a wireless local area network.

9. The method according to claim 1,
wherein the wireless wide area network comprises a desired wireless wide area network,
wherein the user client wireless communication device comprises a subscriber identity module that is used to establish a data connection over a wireless wide area network associated with the subscriber identity module,
wherein the method further comprises:
receiving an authentication challenge while operating on the desired wireless wide area network using the temporary wireless wide area network communication security key;
disconnecting operation on the desired wireless wide area network after receiving the authentication challenge;
establishing at the user client wireless communication device, a communication link with a user wireless wide area network communication device over the wireless wide area network associated with the subscriber identity module;
receiving at least one other temporary wireless wide area network communication security key for the desired wireless wide area network from the user wireless wide area network communication device over the wireless wide area network associated with the subscriber identity module;
disconnecting the communication link over the wireless wide area network associated with the subscriber identity module; and
reconnecting to the desired wireless wide area network using the at least one other temporary wireless wide area network communication security key.

10. The method according to claim 9, wherein subscriber information associated with the subscriber identity module in the user client wireless communication device is different from subscriber information associated with a subscriber identity module in the user wireless wide area network communication device communication device.

11. The method according to claim 1, further comprising running a failsafe mechanism to return operation on the wireless wide area network to the user wireless wide area network communication device.

12. The method according to claim 1, further comprising disconnecting all communication links between the user client wireless communication device and the user wireless wide area network communication device,
wherein operating comprises operating the user client wireless communication device on the wireless wide area network using the at least one temporary wireless wide area network communication security key from the user wireless wide area network communication device while all communication links between the user client wireless communication device and the user wireless wide area network communication device are disconnected.

13. The method according to claim 1, further comprising:
receiving a paging information message from the user wireless wide area network communication device for future paging messages over the wireless wide area network while operating the user client wireless communication device on the wireless wide area network, wherein the paging information message includes information enabling reception of future paging messages; and
receiving paging messages at the client wireless communication device when the user wireless wide area network device is attached to the network.

14. The method according to claim 1, further comprising synchronizing, between the user client wireless communication device and the user wireless wide area network communication device over a communication link with the user wireless wide area network communication device, information regarding activities over the wireless wide area network.

15. A user client wireless communication device comprising:
a communication interface configured to establish a communication link with a user wireless wide area network communication device; and
a wireless wide area network transceiver configured to receive a random challenge and an authentication token from a wireless wide area network, wherein the communication interface is configured to send the random challenge and the authentication token to the user wireless wide area network communication device, and configured to receive at least one temporary wireless wide area network communication security key from the user wireless wide area network communication device, where the at least one temporary wireless wide area network communication security key is for the wireless wide area network, and wherein the user client wireless communication device further comprises a controller configured to operate the user client wireless communication device on the wireless wide area network independent from the user wireless wide area network communication device by using the at least one temporary wireless wide area network communication security key from the user wireless wide area network communication device.

16. The user client wireless communication device according to claim 15, wherein the at least one temporary wireless wide area network communication security key comprises at least one key generated from a secret key present on the user wireless wide area network communication device.

17. A method in a user wireless wide area network communication device, the method comprising:

establishing at the user wireless wide area network communication device, a communication link with a user client wireless communication device;

receiving a random challenge and an authentication token for a wireless wide area network from the user client wireless communication device while detached from the wireless wide area network;

generating a response to the random challenge; and sending the response to the random challenge to the user client wireless communication device.

18. The method according to claim 17, further comprising:

generating at least one temporary wireless wide area network communication security key from a secret key present on the user wireless wide area network communication device; and sending the at least one temporary wireless wide area network communication security key to the user client wireless communication device.

19. The method according to claim 17, further comprising sending an indication that the user wireless wide area network communication device is detached from the wireless wide area network to the client wireless communication device prior to receiving the random challenge and the authentication token.

20. The method according to claim 17, further comprising disconnecting the communication link with the user client wireless communication device after sending the response to the random challenge to the user client wireless communication device.

21. The method according to claim 17, further comprising:

receiving a paging information message from the user client wireless wide area network communication device for future paging messages over the wireless wide area network while operating the user wireless wide area network communication device on the wireless wide area network, wherein the paging information message includes information enabling reception of future paging messages; and receiving paging messages at the user wireless wide area network communication device when the user client wireless communication device is attached to the network.

22. A user wireless wide area network communication device comprising:

a communication interface configured to establish at the user wireless wide area network communication device, a communication link with a user client wireless communication device and configured to receive a random challenge and an authentication token for a wireless wide area network from the user client wireless communication device over the communication link while the user wireless wide area network communication device is detached from the wireless wide area network; and a controller configured to generate a response to the random challenge, wherein the communication interface is configured to send the response to the random challenge to the user client wireless communication device.

23. The user wireless wide area network communication device according to claim 22, wherein the controller is configured to generate at least one temporary wireless wide area network communication security key from a secret key present on the user wireless wide area network communication device, and wherein the communication interface is configured to send the at least one temporary wireless wide area network communication security key to the user client wireless communication device.

24. The user wireless wide area network communication device according to claim 22, wherein the communication interface is configured to send an indication that the user wireless wide area network communication device is detached from the wireless wide area network to the client wireless communication device prior to receiving the random challenge and the authentication token.

* * * * *